United States Patent
Kazama et al.

(10) Patent No.: US 8,444,054 B2
(45) Date of Patent: May 21, 2013

(54) INFORMATION ACCESS SYSTEM AND METHOD FOR ACCESSING INFORMATION IN CONTACTLESS INFORMATION STORAGE DEVICES

(75) Inventors: Satoshi Kazama, Kawasaki (JP);
Yoshiyasu Nakashima, Kawasaki (JP);
Koichi Yokota, Kawasaki (JP); Shinichi Shiotsu, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1067 days.

(21) Appl. No.: 11/277,708

(22) Filed: Mar. 28, 2006

(65) Prior Publication Data
US 2007/0138277 A1 Jun. 21, 2007

(30) Foreign Application Priority Data
Dec. 21, 2005 (JP) .................................. 2005-367303

(51) Int. Cl.
*G06K 7/00* (2006.01)

(52) U.S. Cl.
USPC ........................ 235/439; 340/10.31; 340/10.1

(58) Field of Classification Search
USPC ......................................................... 235/439
See application file for complete search history.

(56) References Cited

U.S. PATENT DOCUMENTS

| 2005/0206555 A1* | 9/2005 | Bridgelall et al. | 342/127 |
| 2006/0170565 A1* | 8/2006 | Husak et al. | 340/825.49 |
| 2007/0037529 A1 | 2/2007 | Nagai et al. | |
| 2007/0103303 A1* | 5/2007 | Shoarinejad | 340/572.1 |

FOREIGN PATENT DOCUMENTS

| JP | 11-126240 | 5/1999 |
| JP | 2002-100920 | 4/2002 |
| JP | 2004-282522 | 10/2004 |
| JP | 2005-149523 | 6/2005 |
| JP | 2005-197797 | 7/2005 |
| JP | 2005-311740 | 11/2005 |
| WO | WO-2005/104142 | 11/2005 |

* cited by examiner

*Primary Examiner* — Thien M Le
*Assistant Examiner* — Tae Kim
(74) *Attorney, Agent, or Firm* — Fujitsu Patent Center

(57) ABSTRACT

An information access system comprises: antennas arranged at respective different positions and used for communicating with contactless information storage devices that pass through a predetermined region substantially simultaneously; reader devices coupled to the respective antennas and adapted to communicate with the contactless information storage devices; and a control unit for controlling the reader devices and transmitting, to another apparatus, data received from the reader devices. In response to a control signal received from the other apparatus, the control unit controls predetermined one of the reader devices to transmit an RF identification request signal to the predetermined region via the antenna. The reader devices receive RF response signals from the contactless information storage devices via the antennas, then reproduce identifications, and then provide the reproduced identifications to the control unit. The control unit receives the reproduced identifications, and then processes redundant identifications in the received identifications so as to produce distinct identifications having no redundancy.

6 Claims, 13 Drawing Sheets

EXAMPLE OF SEND COMMAND AND RESPONSE DATA FORMATS
COMMUNICATED BETWEEN TAG READER/WRITER AND RF ID TAG a) READ MULTIPLE BLOCKS

SEND COMMAND

| SOF | Flags | Read Multiple Block | UID | First Block Number | Number Of Blocks | CRC16 | EOF |

RESPONSE DATA

| SOF | Flags | Block Security Status | Data | CRC16 | EOF | b) WRITE MULTIPLE BLOCKS

SEND COMMAND

| SOF | Flags | Write Multiple Block | UID | First Block Number | Number Of blocks | Data | CRC16 | EOF |

RESPONSE DATA

| SOF | Flags | CRC16 | EOF |

FIG. 5

INFORMATION ACCESS SYSTEM AND METHOD FOR ACCESSING INFORMATION IN CONTACTLESS INFORMATION STORAGE DEVICES

FIELD OF THE INVENTION

The present invention relates to a system for reading a plurality of contactless information storage devices, such as RF ID tags and contactless IC cards.

BACKGROUND OF THE INVENTION

Recently, RF ID tags and contactless IC cards or smartcards are spreading widely. RF ID tags are applicable to merchandise management systems, inventory management systems, physical distribution systems, and the like in compliance with the ISO 15693 standard. Contactless IC cards are applicable to resident registry cards in compliance with the ISO 14443 standard, electronic ticket cards in compliance with the FeliCa® system, employee ID cards, electronic money, and the like. Such RF ID tags and IC cards are read and written into by contactless reading and writing devices, i.e. reader/writer devices.

Passive information storage devices or media such as so-called passive RF ID tags and contactless IC cards include no battery, and hence are required to receive electric power which is electromagnetically induced by a carrier transmitted by a contactless reader/writer device. Thus, for example, when a contactless reader/writer device located at a gate transmits an RF command signal and receives an RF response signal, an RF ID tag or a contactless IC card at a distant position may not be able to receive the RF command signal. On the other hand, the contactless reader/writer device may not be able to detect an ID carried by the RF response signal due to the weakness of the transmission power of the RF response signal transmitted by the RF ID tag or the contactless IC card located at a distant position.

Japanese Patent Application Publication JP 2004-282522-A published on Oct. 7, 2004 by Kori describes an RF ID tag transmitting and receiving circuit. In the transmitting and receiving circuit, a decoding circuit of the RF ID tag transmitting and receiving circuit processes a plurality of pieces of encoded data which have been received via a plurality of receiving antennas and then demodulated, to decode the data transmitted as responses from an RF ID tag. Thus, the decoding circuit decodes the plurality of pieces of encoded data, so that high cannel quality is achieved.

Japanese Patent Application Publication JP 2005-197797-A published on Jul. 21, 2005 by Sato et al. describes an RF tag reader device and an antenna unit for the RF tag reader device. The RF tag reader device includes a control circuit for generating access information used for accessing RF tag information stored in an IC circuit of an RF tag circuit element attached to a target article; a transmission antenna for transmitting this access information to an antenna of the RF tag circuit element to thereby perform access; and an antenna unit having two receiving antennas for receiving a response signal transmitted in response to the transmitted access information. The two receiving antennas are connected in such a manner that their distances are adjustable.

Japanese Patent Application Publication JP 2002-100920-A published on Apr. 5, 2002 by Uchida describes an RF information processing apparatus. An RF tag reader/writer transmits and receives an RF signal to and from an RF tag. The RF tag reader/writer has a receiving antenna formed by a first divided antenna and a second divided antenna. In the first divided antenna, a plurality of small antenna coils are arranged in a plane in a checker board pattern, while these small antenna coils are connected in series in a drawn-with-one-stroke manner. The second divided antenna is arranged so as to face the first divided antenna. In this arrangement, a plurality of small antenna coils of the second divided antenna are arranged in a plane in a checker board pattern in such a manner that each small antenna coil does not face the small antenna coils of the first divided antenna. These small antenna coils are connected in series in a drawn-with-one-stroke manner. This reduces the number of possible collisions among RF communication media.

Japanese Patent Application Publication JP HEI 11-126240-A published on May 11, 1999 by Sasuga et al. discloses a reader/writer controller, in which in a state of receive ready, a power supply for a transmitter unit is intermittently turned ON for transmitting command data.

SUMMARY OF THE INVENTION

In accordance with an aspect of the present invention, an information access system for accessing information stored in a plurality of contactless information storage devices, comprises: a plurality of antennas arranged at respective different positions and used for communicating with the plurality of contactless information storage devices that pass through a predetermined region substantially simultaneously; a plurality of reader devices coupled to the plurality of respective antennas and adapted to communicate with the plurality of contactless information storage devices; and a control unit for controlling the plurality of reader devices and transmitting, to another apparatus, data received from the plurality of reader devices. In response to a control signal received from the other apparatus, the control unit controls predetermined one of the plurality of reader devices to transmit an RF identification request signal toward the predetermined region via the corresponding antenna. The plurality of reader devices receive RF response signals from the plurality of contactless information storage devices via the plurality of antennas, then reproduce identifications, and then provide the reproduced identifications to the control unit. The control unit receives the reproduced identifications, then processes redundant identifications in the received identifications so as to produce distinct identifications having no redundancy, and then provides the distinct identifications having no redundancy to the other apparatus.

In accordance with another aspect of the invention, in response to a control signal received from the other apparatus, the control unit may be adapted to select predetermined one of the plurality of reader devices, and control the one selected reader device to transmit an RF identification request signal toward the predetermined region via the corresponding antenna.

The invention also relates to a method for accessing information stored in a plurality of contactless information storage devices in the information access system described above.

BRIEF DESCRIPTION OF THE DRAWINGS

FIG. 5 shows a known format of send command including read and write requests from the reader/writer device to the RF ID tags, and a known format of response data provided from each of the RF ID tags to the reader/writer devices;

DESCRIPTION OF THE PREFERRED EMBODIMENTS

A plurality of tag reader/writer devices with respective antennas are conventionally employed in a gate to read and write information from and into a plurality of RF ID tags passing through the gate. In order to prevent RF command signals transmitted via these antennas from interfering with each other, a plurality of the antennas are selected in a time division manner, so that RF command signals are transmitted and received sequentially through the respective antennas. These RF response signals transmitted by the RF ID tags have so low intensity of output transmission power that the reader/writer devices can receive RF response signals transmitted only by the RF ID tags near the antennas. Thus, a long period of time, for example, of 800 milliseconds is required for the reader/writer devices to complete communication with all of the RF ID tags using all of the antennas. Thus, packages to which a plurality of the RF ID tags are attached or persons who carry the RF ID tags are required to stay at the gate for such a period of time, which reduces efficiency of reading and writing information from and into the RF ID tags. Further, depending on the electromagnetic propagation environment, the reader/writer device transmits an RF command signal to receive an RF response signal but may receive no RF response signal from an RF ID tag even via the nearest antenna, so that information such as the ID of the RF ID tag cannot be read.

The inventors have recognized that RF response signals from a plurality of RF ID tags can be simultaneously received by a plurality of distributed antennas, so that the RF response signals from a plurality of the RF ID tags can be received substantially simultaneously or in a short period of time, which allows redundancy of the received information transmitted by the plurality of RF ID tags and thereby improves reliability in the received information.

An object of the invention is to reduce a period of time required for receiving RF response signals from a plurality of contactless information storage devices.

Another object of the invention is to improve the reliability of received information from a plurality of contactless information storage devices.

According to the invention, a period of time required can be reduced for receiving RF response signals from a plurality of contactless information storage devices, and the reliability of received information from a plurality of contactless information storage devices can be improved.

The invention will be described in connection with non-limiting embodiments with reference to the accompanying drawings. Throughout the drawings, similar symbols and numerals indicate similar items and functions.

Figure 1:
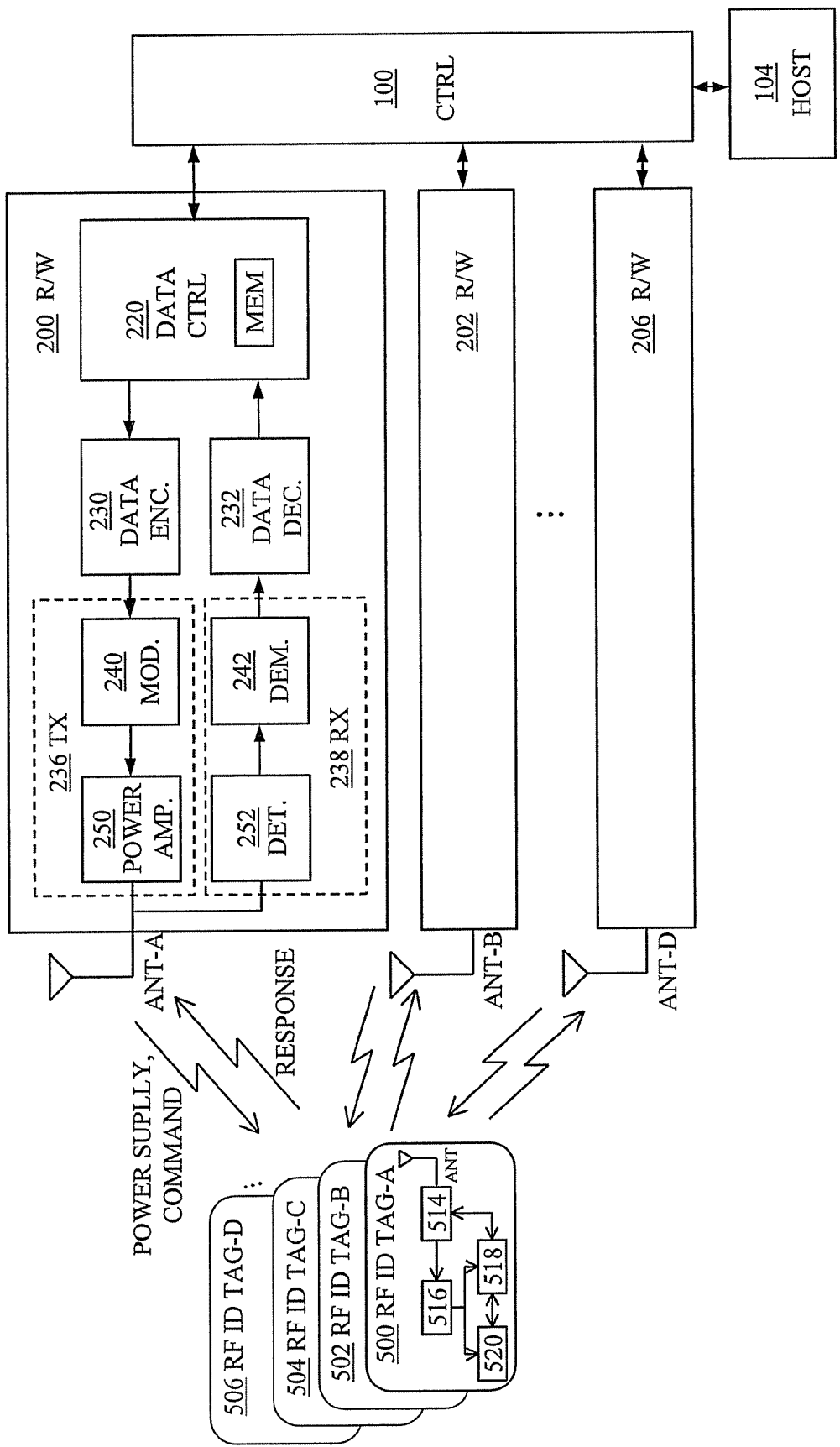
FIG. 1 shows RF ID tags as passive contactless information storage devices, contactless reader/writer devices for transmitting to the RF ID tags an RF command signal for reading information, a reader/writer control unit for transmitting and receiving data to and from the reader/writer devices and thereby controlling the reader/writer devices, in accordance with an embodiment of the present invention.

FIG. 1 shows RF ID tags (TAG-A, TAG-B, TAG-C, . . . , and TAG-D) 500, 502, 504, . . . , and 506 as passive contactless information storage devices, contactless reader/writer devices (R/Ws) 200, 202, . . . , and 206 for transmitting to the RF ID tags 500-506 an RF command signal for reading information, a reader/writer control unit 100 for transmitting and receiving data to and from the reader/writer devices 200-206 to thereby control the reader/writer devices 200-206, and a host computer or apparatus 104 for providing control signals to the reader/writer control unit 100 and then utilizing received information such as tag IDs, in accordance with an embodiment of the present invention. Alternatively, the RF ID tags 500-506 may be active RF ID tags.

The reader/writer device 200 includes: a data control unit 220; a transmission data encoding unit 230 coupled to the data control unit 220 for generating encoded data for transmission; a coil antenna (ANT); a transmitter unit (TX) 236 coupled to the coil antenna; a receiver unit (RX) 238; and a received data decoding unit 232. The transmitter unit 236 includes: a modulation unit 240 for transmission; and a transmission power amplifying unit 250 coupled to the coil antenna (ANT). The receiver unit 238 has a detector unit 252 coupled to the coil antenna (ANT), and a demodulation unit 242 for reception. Each of the reader/writer devices 202-206 may have the same configuration as the reader/writer device 200, or alternatively may include neither the data encoding unit 230 nor the transmitter unit 236 and hence may only receive an RF signal.

Each of the RF ID tags 500-506 includes a coil antenna ANT, an RF modulation and demodulation circuit 514, a power supply circuit 516 of a passive type, a logic circuit 518 and a memory 520. The RF modulation and demodulation circuit 514 receives and demodulates a received RF signal carrying a read command from a reader/writer device, to reproduce the command. In response to the received read command, the logic circuit 518 of each of the RF ID tags 500-506 reads a tag ID as identification information of that RF ID tag stored in the memory 520. The RF modulation and demodulation circuit 514 modulates a carrier with the tag ID and transmits the modulated carrier as an RF response signal.

Each of ones of the reader/writer devices 200-206 that have the transmitting function transmits an RF signal preferably at a transmission power required for communication in a range of from a few tens cm to 3 m. Each of the RF ID tags 500-506 transmits an RF signal preferably at a transmission power required for communication in a range of from a few tens cm to 2 m. Each RF ID tag has the intensity of the transmission power which is sufficient for transmitting the RF signal to reach the nearest at least one antenna, but may be insufficient for transmitting the RF signal to reach all of the antennas ANT-A through ANT-D. Typically, a passive RF ID tag has a higher transmission power than an active RF ID tag. However, the communication range of the RF signal depends on the electromagnetic environment.

Figure 2:
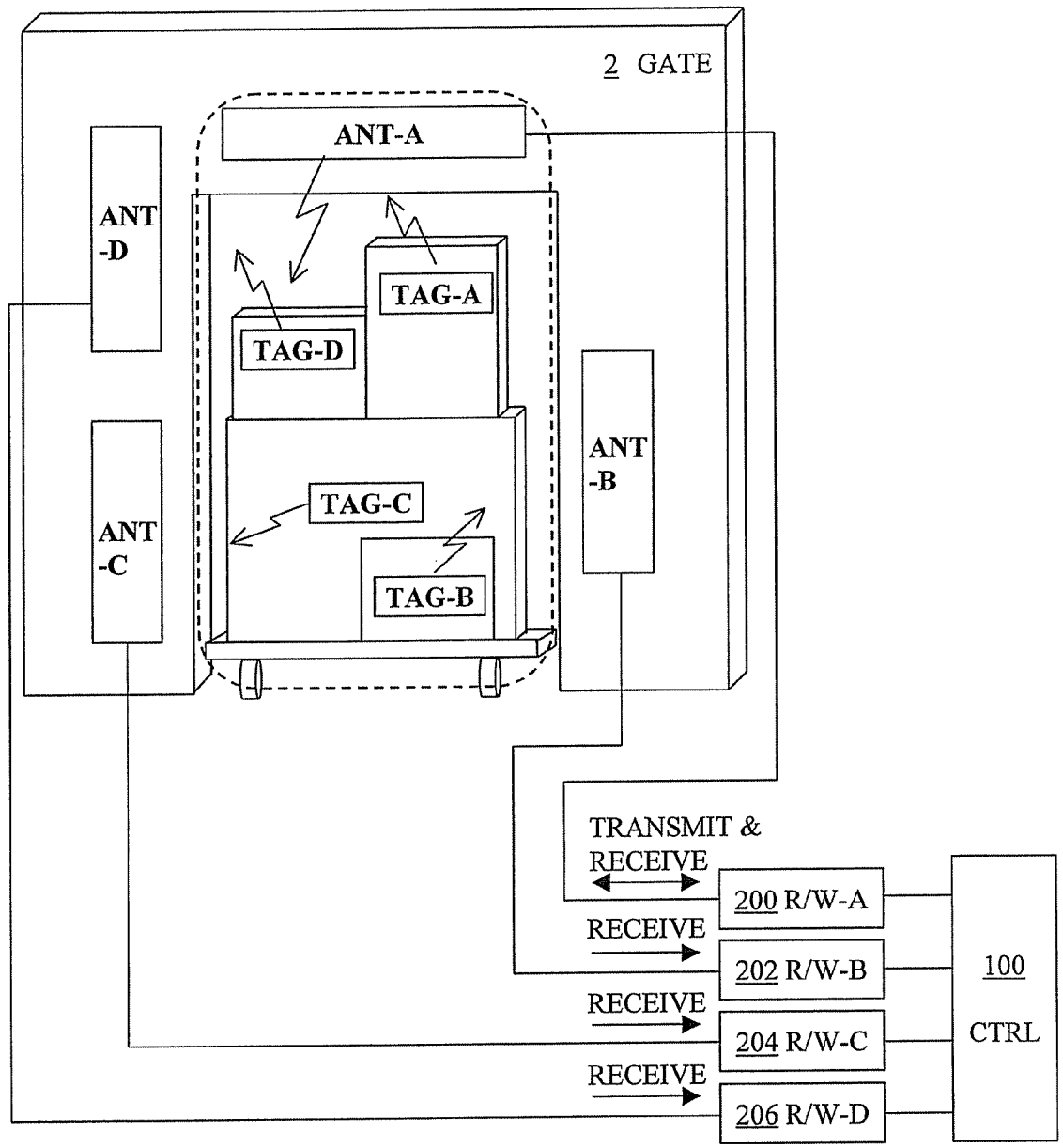
FIG. 2 shows a gate provided with a plurality of antennas distributed on the gate in a manner to surround a plurality of passing packages and connected to respective reader/writer devices in accordance with the embodiment of the invention.

FIG. 2 shows a gate 2 provided with a plurality of antennas ANT-A through ANT-D distributed on the gate 2 in a manner to surround a plurality of packages passing through the gate 2 and connected to respective reader/writer devices R/W-A through R/W-D 200-206 in accordance with the embodiment of the invention. A plurality of packages having the respective RF ID tags TAG-A through TAG-D pass through the gate 2 substantially simultaneously.

The reader/writer device 200 transmits an RF signal carrying an ID request command at such a sufficiently high transmission power that allows the RF signal to be received by all of the RF ID tags TAG-A through TAG-D 500-506 that pass through the gate 2 substantially simultaneously as indicated by a broken line, and then receives ones of possible RF response signals from the RF ID tags TAG-A through TAG-D. The other reader/writer devices 202-206 transmit no RF signal, but receive any ones of possible RF response signals from the RF ID tags TAG-A through TAG-D.

Figure 3:
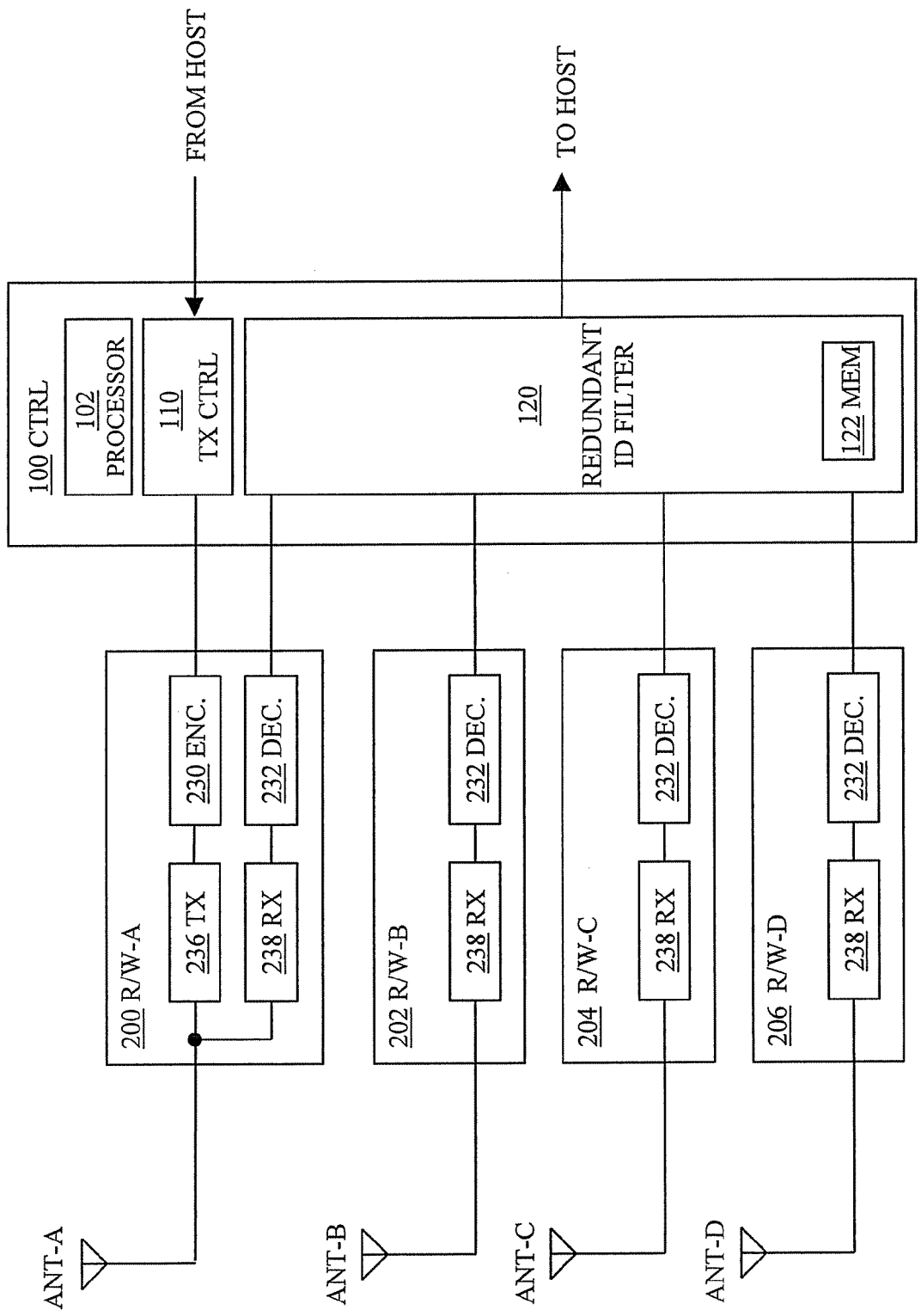
FIG. 3 shows a form of configurations and connections of a reader/writer control unit and the reader/writer devices in the embodiment.

FIG. 3 shows a form of configurations and connections of a reader/writer control unit 100 and the reader/writer devices R/W-A through R/W-D 200-206 in this embodiment. In the figure, the data control unit 220 is not shown in each of the reader/writer devices 200-206.

As shown in FIG. 1, the reader/writer device R/W-A 200 includes the data control unit 220, the transmission data encoding unit 230, the coil antenna ANT-A, the transmitter unit (TX) 236, the receiver unit (RX) 238, and the received data decoding unit 232. Each of the other reader/writer devices R/W-B through R/W-D 202-206 includes the data control unit 220, the coil antenna ANT, the receiver unit (RX) 238, and the received data decoding unit 232, and may further include or may not include a combination of the transmission data encoding unit 230 and the transmitter unit (TX) 236, which are not used even if they are included.

The reader/writer control unit 100 includes a transmission control unit 110 coupled to the data encoding unit 230 of the reader/writer device R/W-A 200 via the data control unit 220, and a redundant ID filtering unit 120 coupled to the data decoding units 232 of the reader/writer device R/W-A through R/W-D 200-206. The redundant ID filtering unit 120 has a memory 122 for accumulatively storing received IDs. The functions of the transmission control unit 110, the redundant ID filtering unit 120 and the like may be implemented on a processor 102 in accordance with programs stored in a memory of the reader/writer control unit 100.

Figure 4:
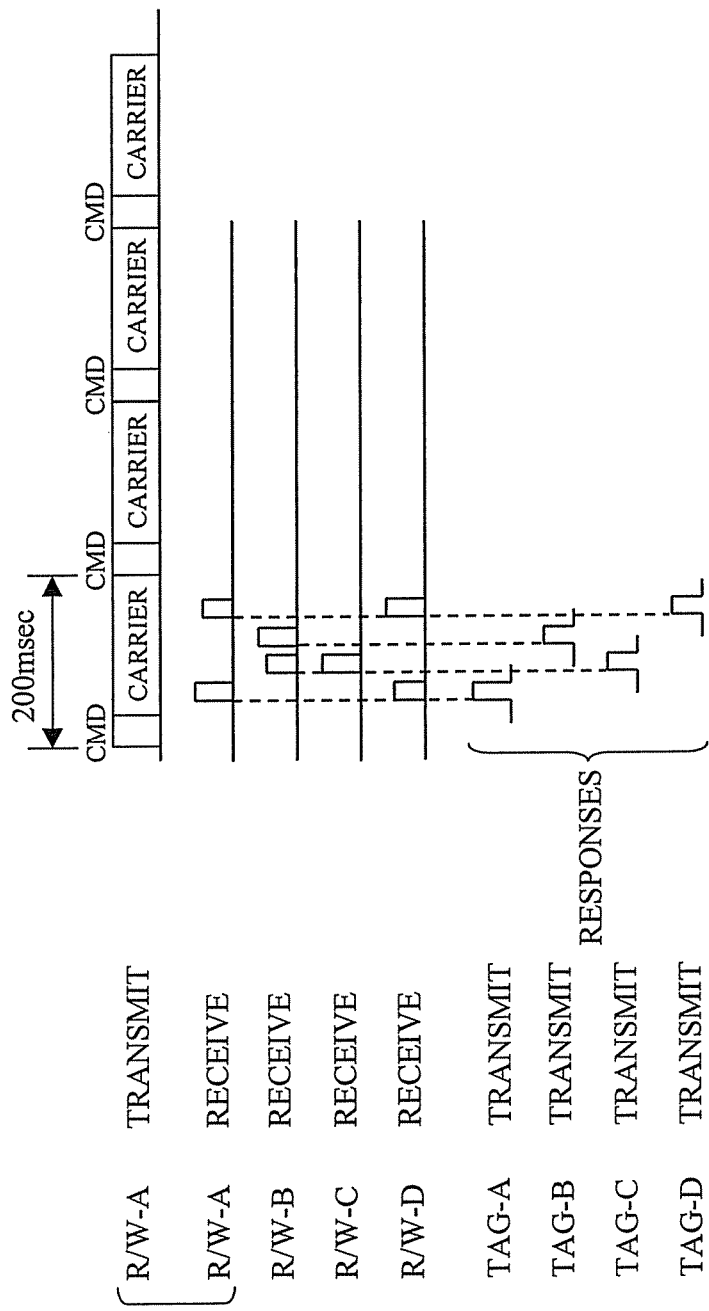
FIG. 4 shows an example of a time chart of transmission and reception between the reader/writer devices and the RF ID tags.

FIG. 4 shows an example of a time chart of transmission and reception between the reader/writer devices R/W-A through R/W-D 200-206 and the RF ID tags TAG-A through TAG-D 500-506.

Referring to FIGS. 2 through 4, the reader/writer device R/W-A (200) transmits an RF signal which is generated by modulating a carrier with an ID request command CMD, during a short period of time, for example, of 10 msec, and then transmits a non-modulated carrier during a subsequent long period of time, for example, of 190 msec so as to supply electromagnetic energy to the RF ID tags. The reader/writer device R/W-A (200) transmits both of the RF signal and the non-modulated carrier in a cycle, for example, of 200 msec.

In response to the RF signal carrying the ID request command received from the reader/writer device R/W-A (200), each of the RF ID tags TAG-A through TAG-D (500-506) transmits back an RF response signal which is generated by modulating a carrier with each tag ID, in a time slot determined at random in accordance with a random number.

The receiver unit 238 of each of the reader/writer devices R/W-A through R/W-D (200-206) is always in a state of receive ready. However, RF response signals transmitted from some of the RF ID tags TAG-A through TAG-D (500-506) that are located at positions distant from the antennas ANT-A through ANT-D or located at positions in the poor electromagnetic environment may not be received successfully, so that the command may not be reproduced successfully by decoding.

In FIG. 4, the RF response signal from the RF ID tag TAG-A (500) is received by the reader/writer devices R/W-A and R/W-D (200 and 206), each of which decodes the encoded tag ID carried by the RF response signal to reproduce the tag ID, and then provides the reproduced tag ID to the redundant ID filtering unit 120. The RF response signal from the RF ID tag TAG-B 502 is received only by the reader/writer device R/W-B (202), which decodes the encoded tag ID carried by the RF response signal to reproduce the tag ID, and then provides the reproduced tag ID to the redundant ID filtering unit 120. The RF response signal from the RF ID tag TAG-C (504) is received by the reader/writer devices R/W-B and R/W-C (202 and 204), each of which decodes the encoded tag ID carried by the RF response signal to reproduce the tag ID, and then provides the reproduced tag ID to the redundant ID filtering unit 120. The RF response signal from the RF ID tag TAG-D (506) is received by the reader/writer devices R/W-A and R/W-D (200 and 206), each of which decodes the encoded tag ID carried by the RF response signal to reproduce the tag ID, and then provides the reproduced tag ID to the redundant ID filtering unit 120. Each tag ID is expected to be received by one or more reader/writer devices at a high probability. This improves the reliability of the received tag IDs.

The redundant ID filtering unit 120 accumulatively stores the received tag IDs into the memory 122, and then removes redundant or duplicated identical tag IDs with retaining one tag ID selected from each set of identical stored tag IDs. In this example, the redundant ID filtering unit 120 retains the distinct ones of the tag IDs of the respective RF ID tags TAG-A, TAG-B, TAG-C and TAG-D, and removes redundant ones of the tag IDs of the RF ID tags TAG-A, TAG-C and TAG-D. The redundant ID filtering unit 120 provides the distinct, redundancy-filtered tag IDs to the host computer 104.

FIG. 5 shows a known format of send command including read and write requests from the reader/writer device 200 to the RF ID tags TAG-A through TAG-D 500-506, and a known format of response data provided from each of the RF ID tags TAG-A through TAG-D to the reader/writer devices R/W-A through R/W-D.

In accordance with the embodiment of FIG. 2, the transmission of an ID request command in one transmission cycle allows the tag IDs of all of the RF ID tags TAG-A through TAG-D 500-506 passing through the gate 2 to be received by the reader/writer devices R/W-A through R/W-D 200-206 in a short time with high reliability. Further, RF response signals having a short reaching range that are transmitted from the plurality of the RF ID tags TAG-A through TAG-D are received via the plurality of the distributed antennas ANT-A through ANT-D. This reduces the probability of collisions between the RF response signals from the RF ID tags TAG-A through TAG-D. Furthermore, even if a collision occurs between the RF response signals from RF ID tags TAG-A through TAG-D, the tag IDs from all of the RF ID tags TAG-A through TAG-D can acquired in a small number of transmission cycles of transmitting the ID request command.

Figure 6:
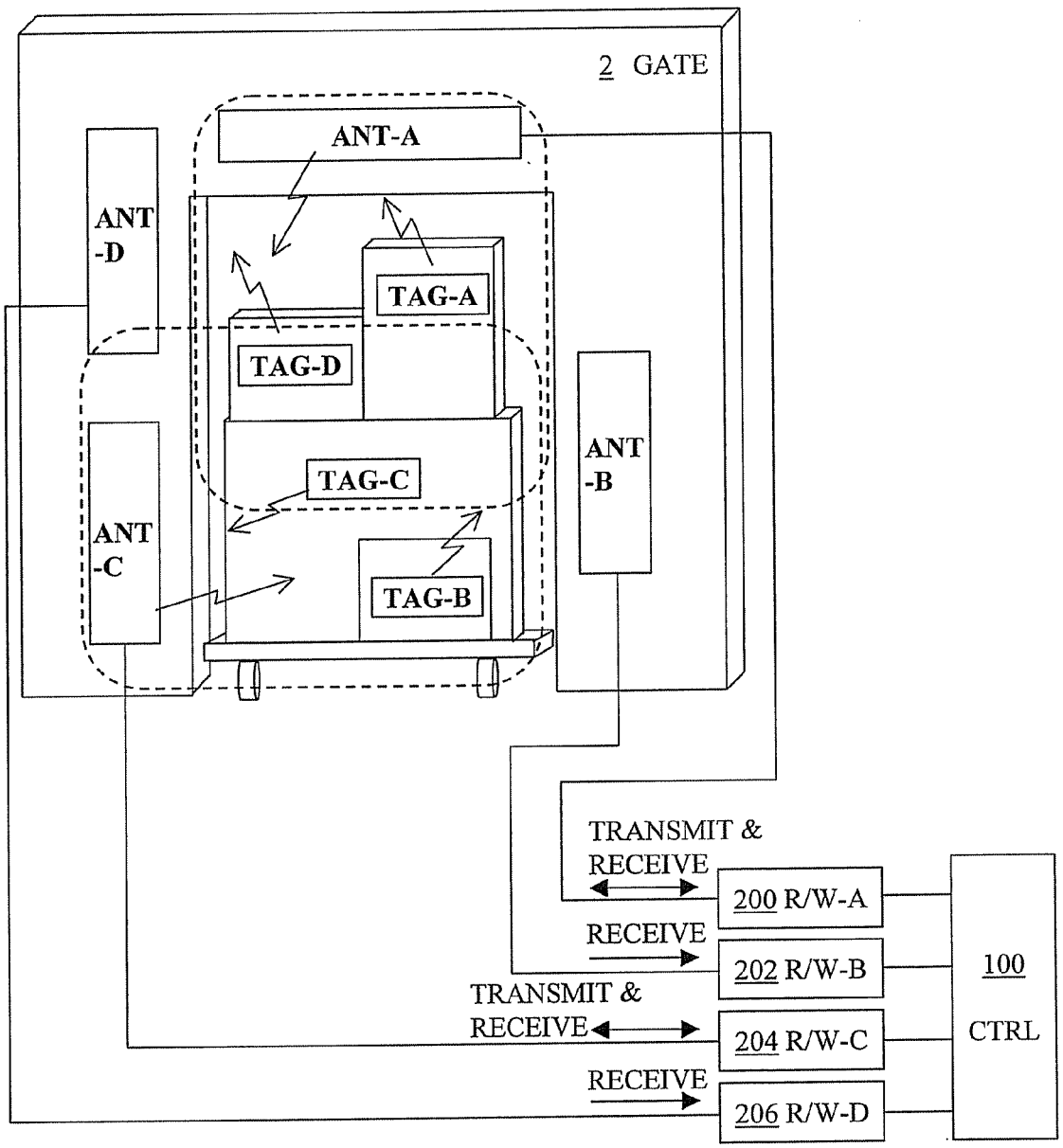
FIG. 6 shows the gate provided with the plurality of antennas distributed on the gate in a manner to surround a plurality of passing packages and connected to respective reader/writer devices in accordance with another embodiment of the invention.

FIG. 6 shows the gate 2 provided with the plurality of antennas ANT-A through ANT-D distributed on the gate 2 in a manner to surround a plurality of passing packages and connected to respective reader/writer devices R/W-A through R/W-D 200-206 in accordance with another embodiment of the invention.

The reader/writer device 200 transmits an RF signal carrying an ID request command at such a sufficiently high transmission power that allows the RF signal to be received by RF ID tags passing through at least a upper partial region of the gate 2 as indicated by a broken line, and then receives possible RF response signals from the RF ID tags. The reader/writer device 204 transmits an RF signal carrying an ID request command at such a sufficiently high transmission power that allows the RF signal to be received by RF ID tags passing through at least a lower, remaining partial region of the gate 2 as indicated by another broken line, and then receives possible RF response signals from the RF ID tags. The other reader/writer devices 202 and 206 transmits no RF signal, but receive possible RF response signals from ones of the RF ID tags TAG-A through TAG-D.

Figure 7:
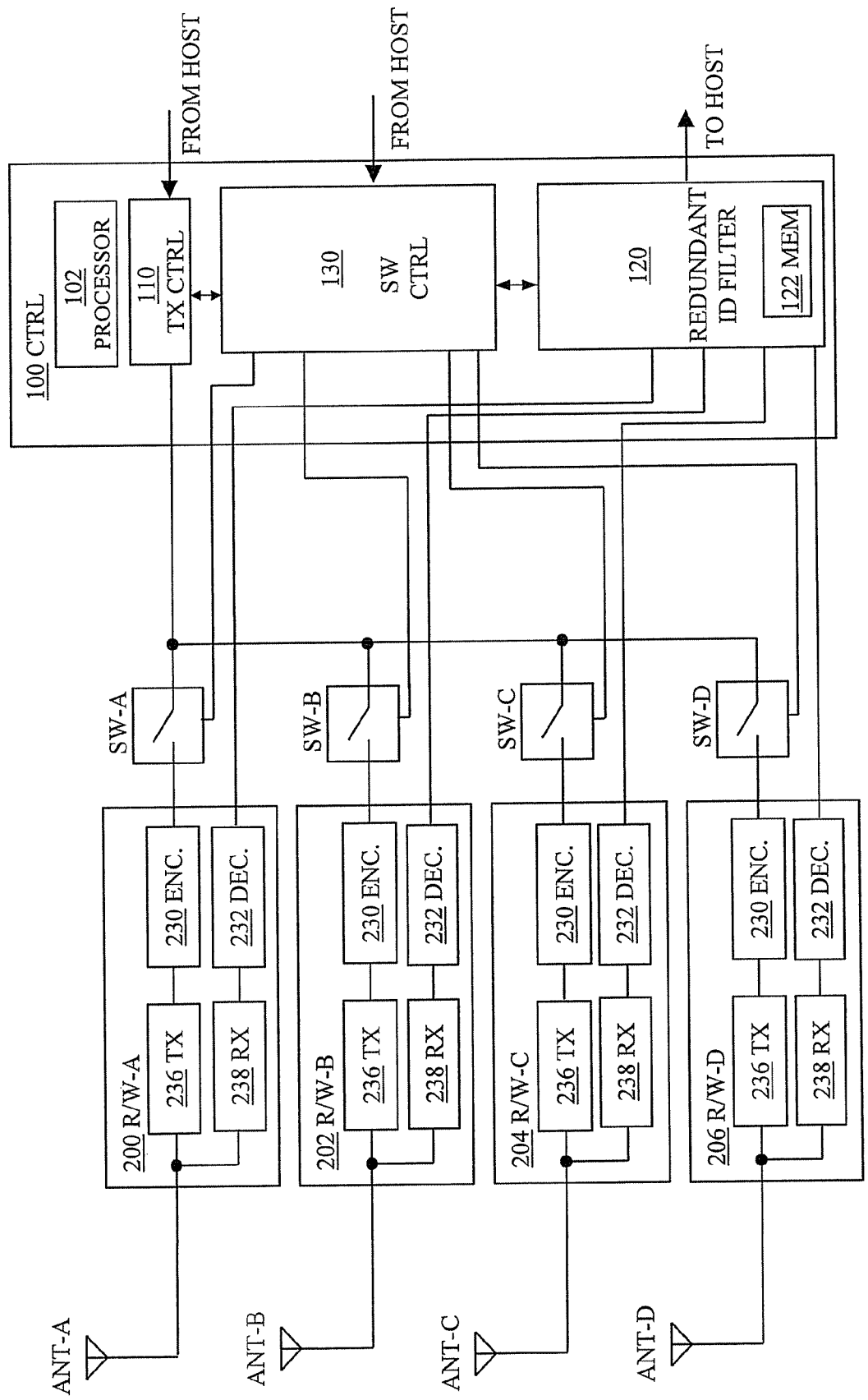
FIG. 7 shows a form of configurations and connections of the reader/writer control unit and the reader/writer devices in the embodiment.

FIG. 7 shows a form of configurations and connections of the reader/writer control unit 100 and the reader/writer devices R/W-A through R/W-D 200-206 in this embodiment. A predetermined number, j ($1 \leq j \leq n$), of reader/writer devices selected from the n reader/writer devices R/W-A through R/W-D 200-206 are used for transmitting RF command signals.

In the embodiment of FIG. 6, each of the two reader/writer devices R/W-A and R/W-C 200 and 204 includes the data control unit 220, the transmission data encoding unit 230, the coil antenna ANT-A, the transmitter unit 236, the receiver unit 238 and the received data decoding unit 232, as shown in FIG. 1. Each of the other reader/writer devices R/W-B and R/W-D 202 and 206 includes the data control unit 220, the coil antenna ANT, the receiver unit 238, and the received data decoding unit 232, and may further include a combination of the transmission data encoding unit 230 and the transmitter unit (TX) 236, which are not used. Alternatively, the reader/writer devices R/W-B and R/W-D 202 and 206 may not include these two units 230 and 236.

The reader/writer control unit 100 includes a transmission control unit (TX CTRL) 110 coupled to the data encoding unit 230 of each of the reader/writer devices R/W-A through R/W-D 200-206 via each data control unit 220 and via each of switches SW-A through SW-D, a redundant ID filtering unit 120 coupled to the data decoding unit 232 of each of the reader/writer devices R/W-A through R/W-D 200-206 via each data control unit 220, and a switch control unit 130 for controlling the ON/OFF states of the switches SW-A through SW-D. The functions of the transmission control unit 110, the redundant ID filtering unit 120, the switch control unit 130 and the like may be implemented on the processor 102 in accordance with programs stored in the memory of the reader/writer control unit 100.

In this embodiment, each of the reader/writer devices R/W-B and R/W-D 202 and 206 does not use the data encoding unit 230 and the transmitter unit 236, or alternatively may not include these two units 230 and 236, as described above. Thus, the switches SW-B and SW-D may be eliminated.

Figure 8:
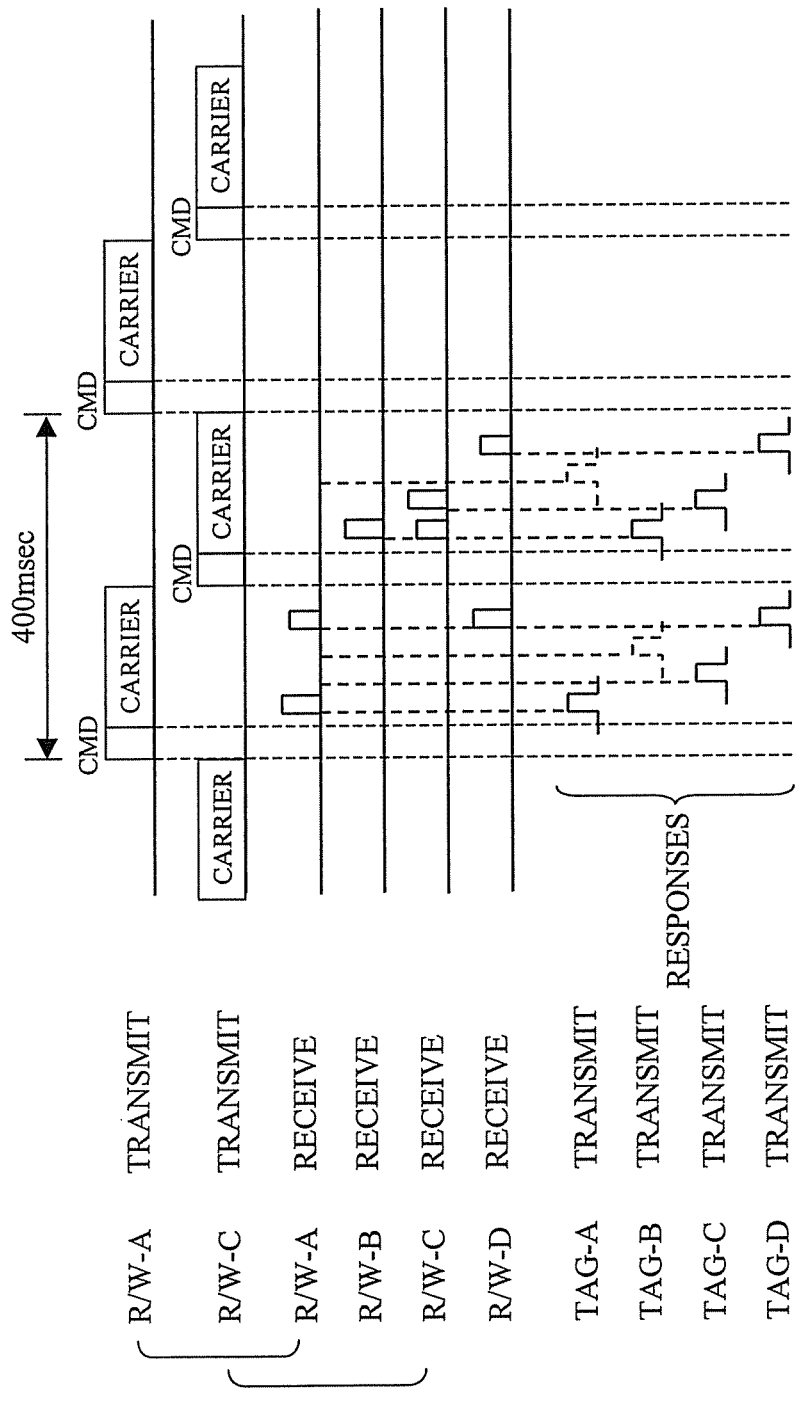
FIG. 8 shows an example of a time chart of transmission and reception between the reader/writer devices and the RF ID tags.

FIG. 8 shows an example of a time chart of transmission and reception between the reader/writer devices R/W-A through R/W-D 200-206 and the RF ID tags TAG-A through TAG-D 500-506.

Referring to FIGS. 6 through 8, the reader/writer devices R/W-A and R/W-C (200 and 204) alternately transmit a combination of an RF signal and a non-modulated carrier in a time division manner in a cycle, for example, of 400 msec. The switches SW-B and SW-D are constantly turned OFF. In response to a control signal from the host computer 104, the switch control unit 130 of the reader/writer control unit 100 first turns ON the switch SW-A and turns OFF the other switch SW-C, so that the transmission control unit 110 provides a transmission command to the reader/writer device R/W-A (200). Upon receipt of the transmission command, the reader/writer device R/W-A transmits an RF signal generated by modulating a carrier with an ID request command CMD during a short period of time, for example, of 10 msec, and then transmits a non-modulated carrier during a subsequent long period of time, for example, of 190 msec so as to supply electromagnetic energy to the possible RF ID tags.

In response to the RF signal carrying the ID request command received from the reader/writer device R/W-A 200, each of the RF ID tags TAG-A, TAG-C and TAG-D (500, 504, and 506) transmits back an RF response signal generated by modulating a carrier with each tag ID, in a time slot determined at random in accordance with a random number. In this case, the RF ID tag TAG-B is located at a position distant from the reader/writer device R/W-A, and hence does not receive the RF signal from the reader/writer device R/W-A.

After that, in response to a control signal from the host computer 104, the switch control unit 130 of the reader/writer control unit 100 turns ON the switch SW-C and turns OFF the other switch SW-A, so that the transmission control unit 110 provides a transmission command to the reader/writer device R/W-C (204). Upon receipt of the transmission command, the reader/writer device R/W-C transmits an RF signal generated by modulating a carrier with an ID request command CMD during a short period of time, and then transmits a non-modulated carrier during a subsequent long period of time so as to supply electromagnetic energy to the RF ID tags.

In response to the RF signal carrying the ID request command received from the reader/writer device R/W-C 204, each of the RF ID tags TAG-B through TAG-D (502-506) transmits back an RF response signal generated by modulating a carrier with each tag ID, in a time slot determined at random in accordance with a random number. In this case, the RF ID tag TAG-A is located at a position distant from the reader/writer device R/W-C, and hence does not receive the RF signal from the reader/writer device R/W-C.

In FIG. 8, subsequent to the ID request command transmitted by the reader/writer device R/W-A (200), the RF response signal from the RF ID tag TAG-A (500) is received only by the reader/writer device R/W-A (200), while the RF response signal from the RF ID tag TAG-C (504) is received by none of the reader/writer devices. Further, the RF response signal from the RF ID tag TAG-D (506) is received by the reader/writer devices R/W-A and R/W-D (200 and 206). The redundant tag IDs carried by these RF response signals are decoded in the reader/writer devices R/W-B and R/W-D, so that the redundant tag IDs are provided to the redundant ID filtering unit 120.

Subsequent to the ID request command transmitted by the reader/writer device R/W-C (204), the RF response signal from the RF ID tag TAG-B (502) is received by the reader/ writer devices R/W-B and R/W-C (202 and 204), while the RF response signal from the RF ID tag TAG-C (504) is received only by the reader/writer device R/W-C (204). Further, the RF response signal of the RF ID tag TAG-D (506) is received only by the reader/writer device R/W-D (206). The redundant tag IDs carried by these RF response signals are decoded in the reader/writer devices R/W-A through R/W-C, so that the redundant tag IDs are provided to the redundant ID filtering unit 120.

The redundant ID filtering unit 120 accumulatively stores the received tag IDs in the memory 122, and then removes redundant or duplicated tag IDs with retaining one tag ID of each set of identical stored tag IDs. The distinct, filtered tag IDs are then provided to the host computer.

Figure 9:
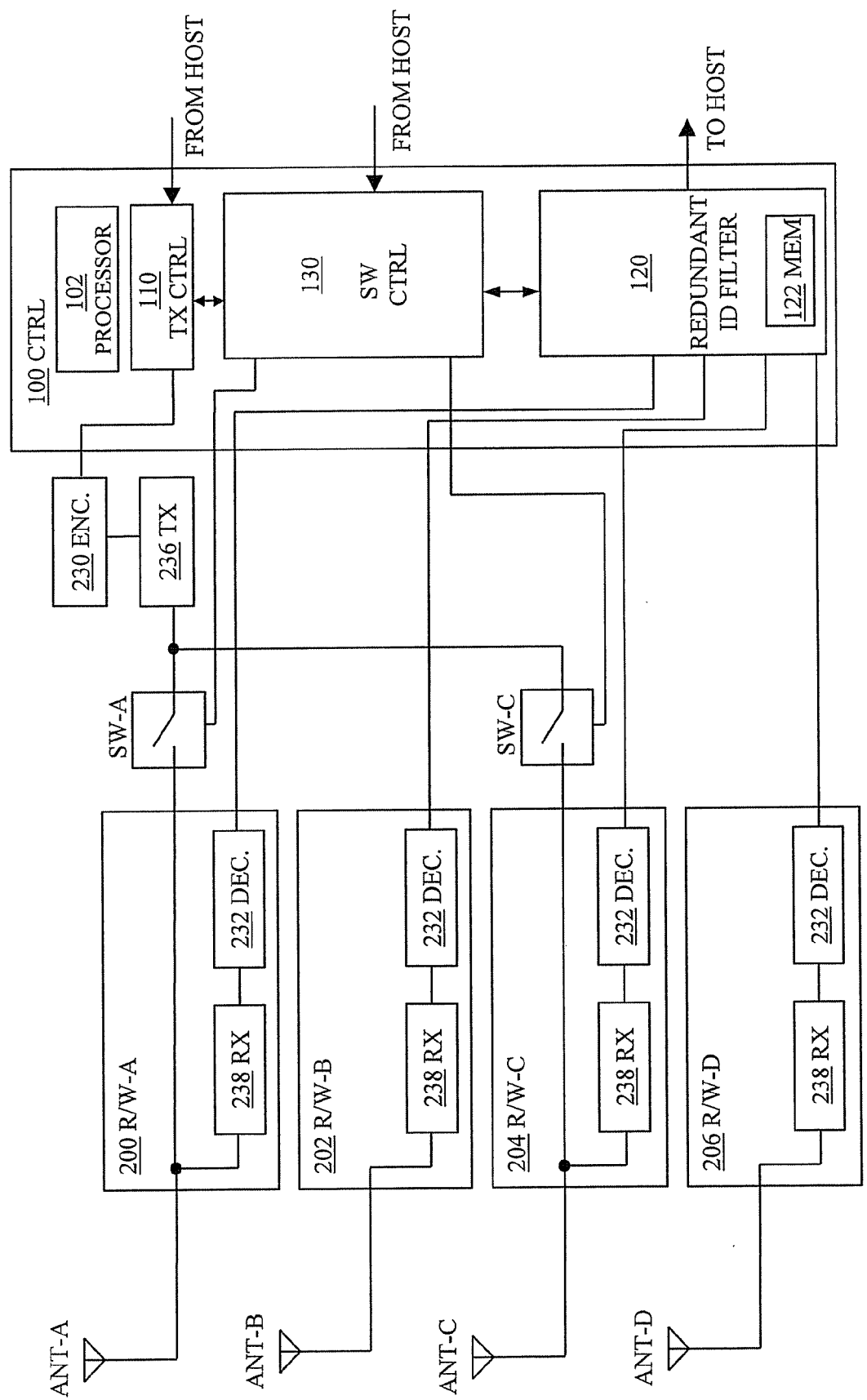
FIG. 9 shows an alternative form of configurations and connections of the reader/writer control unit and the reader/writer devices in the embodiment.

FIG. 9 shows an alternative form of configurations and connections of the reader/writer control unit 100 and the reader/writer devices R/W-A through R/W-D 200-206 in this embodiment.

In FIG. 9, the reader/writer devices R/W-A through R/W-D 200-206 include neither a transmission data encoding unit nor a transmitter unit. Then, a shared transmission data encoding unit 230 and a shared transmitter unit (TX) 236 coupled to the data encoding unit 230 are connected between the transmission control units 110 and the switches SW-A and SW-C associated with the respective reader/writer devices R/W-A and R/W-C 200 and 204. The data encoding unit 230 and the transmitter unit 236 are used for transmission via the antennas ANT-A and ANT-C of the reader/writer devices R/W-A and R/W-C 200 and 204. In this case, the switches SW-B and SW-D shown in FIG. 7 are not provided between the transmission control unit 110 and the reader/writer devices R/W-B and R/W-D 202 and 206.

According to this embodiment, the area through which packages pass can be expanded in the gate 2. In other words, the area for detecting RF ID tags can be expanded.

Figure 10:
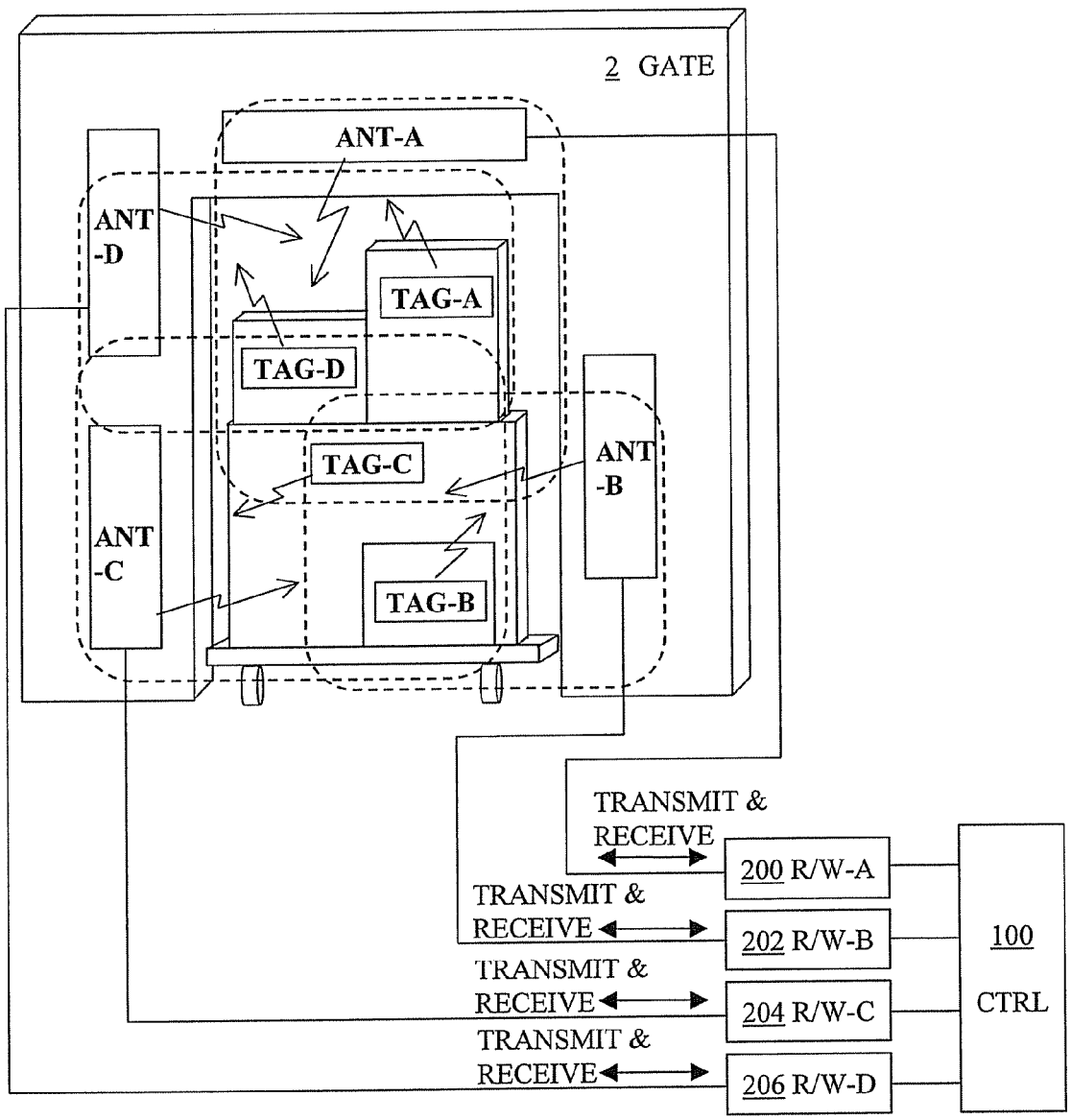
FIG. 10 shows the gate provided with the plurality of antennas distributed on the gate in a manner to surround a plurality of passing-through packages and connected to respective reader/writer devices in accordance with a further embodiment of the invention.

FIG. 10 shows the gate 2 provided with the plurality of antennas ANT-A through ANT-D distributed on the gate 2 in a manner to surround a plurality of passing-through packages and connected to respective reader/writer devices R/W-A through R/W-D 200-206 in accordance with a further embodiment of the invention.

Each of the reader/writer devices 200-206 transmits an RF signal carrying an ID request command at such a sufficiently high transmission power that allows the RF signal to be received by RF ID tags passing through each of different overlapped partial regions of the gate 2 as indicated by broken lines, and then receives possible RF response signals from ones of the RF ID tags TAG-A through TAG-D.

In this embodiment, the configurations and connections of the reader/writer control unit 100 and the reader/writer devices R/W-A through R/W-D 200-206 as shown in FIG. 7 are also used.

Figure 11:
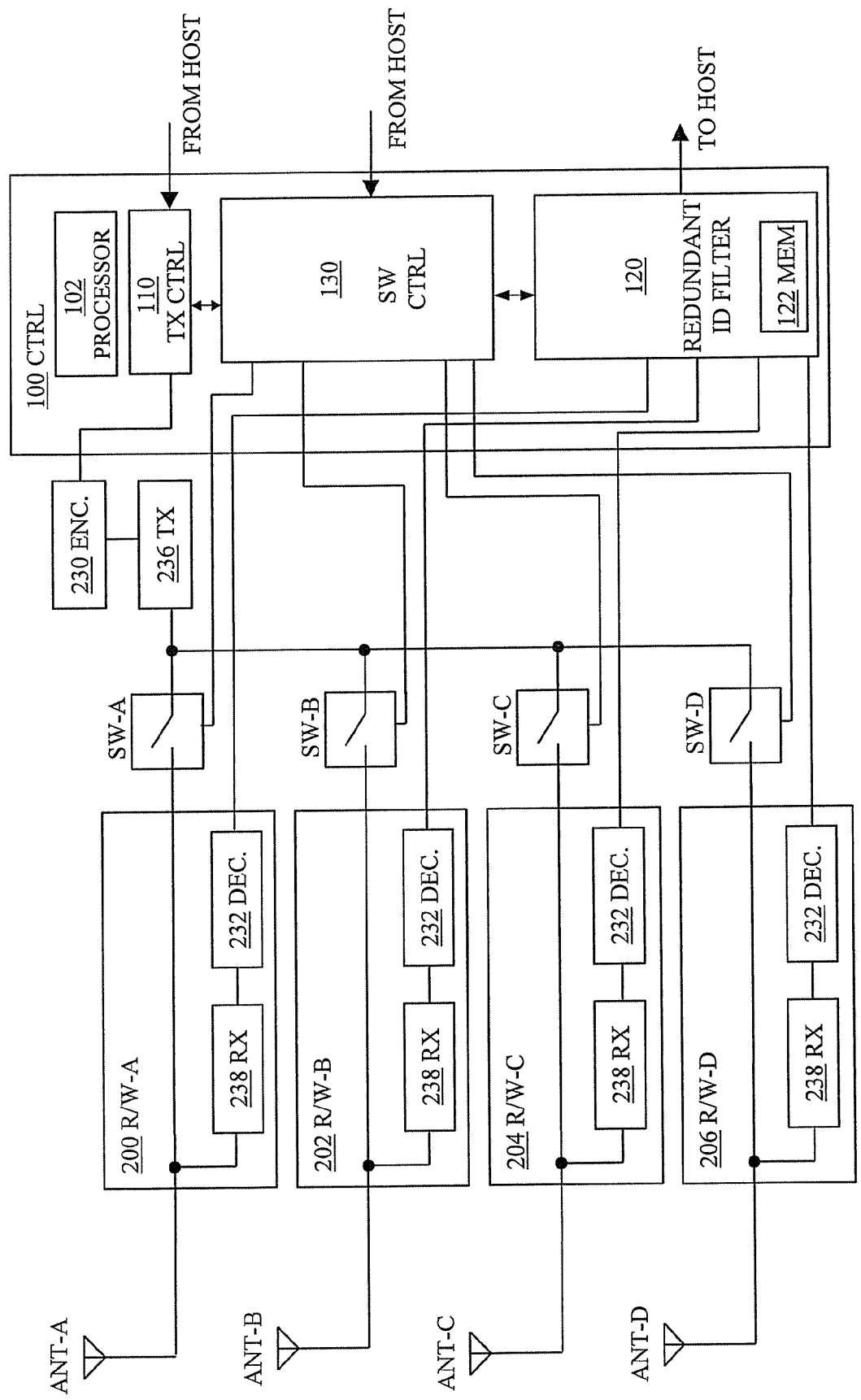
FIG. 11 shows an alternative form of configurations and connections of the reader/writer control unit and reader/writer devices in the embodiment.

FIG. 11 shows an alternative form of configurations and connections of the reader/writer control unit 100 and reader/writer devices R/W-A through R/W-D 200-206 in this embodiment.

In FIG. 11, the reader/writer devices R/W-A through R/W-D 200-206 include neither a transmission data encoding unit nor a transmitter unit. Then, the shared transmission data encoding unit 230 and the shared transmitter unit (TX) 236 coupled to the data encoding unit 230 are connected between the transmission control units 110 and the switches SW-A through SW-D associated with the respective reader/writer devices R/W-A through R/W-D 200-206. The data encoding unit 230 and the transmitter unit 236 are used for transmission by the reader/writer devices R/W-A through R/W-D 200-206.

Figure 12:
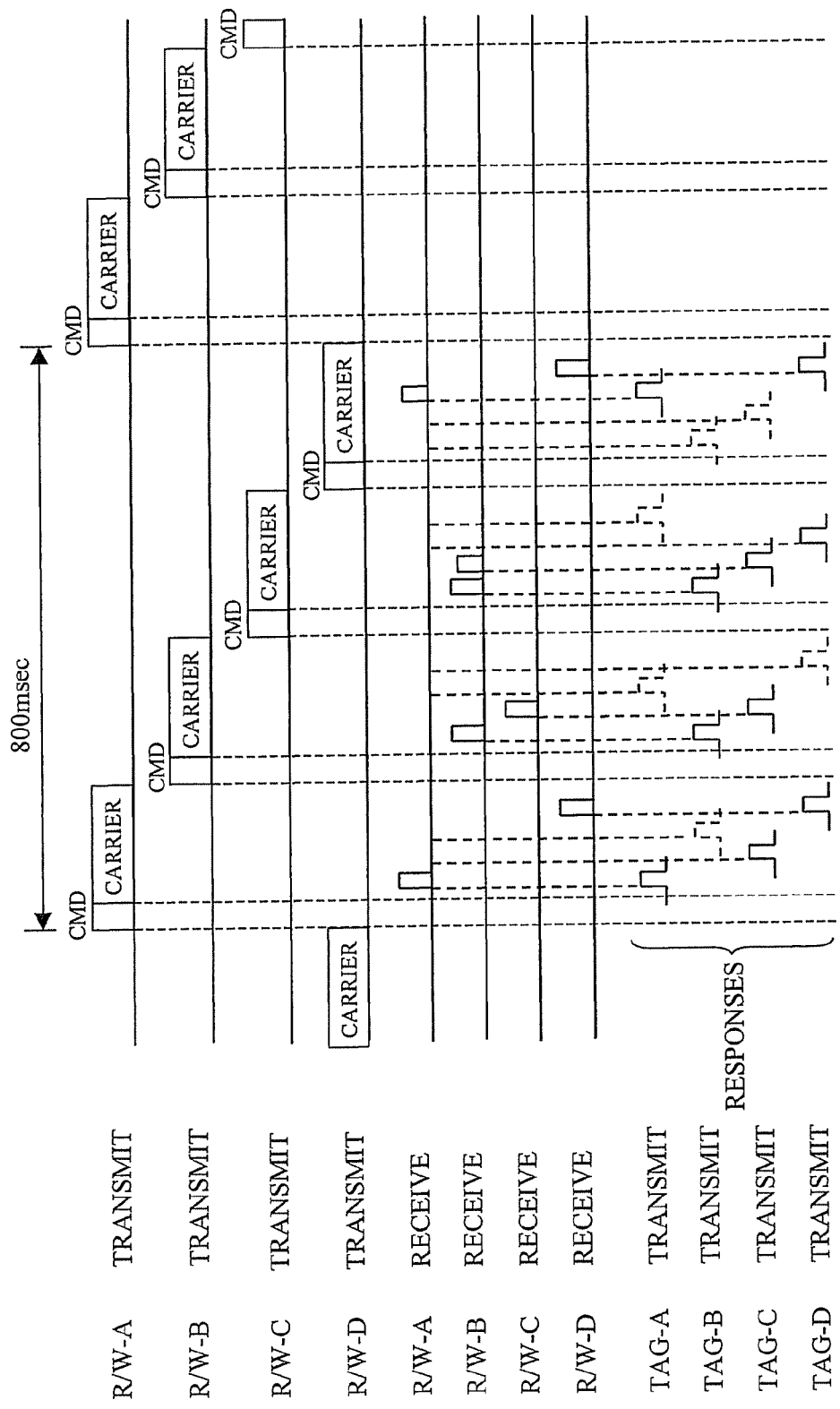
FIG. 12 shows an example of a time chart of transmission and reception between the reader/writer devices and the RF ID tags.

FIG. 12 shows an example of a time chart of transmission and reception between the reader/writer devices R/W-A through R/W-D 200-206 and the RF ID tags TAG-A through TAG-D 500-506.

Referring to FIGS. 7, 10 and 12, the reader/writer devices R/W-A through R/W-D (200-206) in a cyclic order transmit a combination of an RF signal and a non-modulated carrier in a time division manner in a cycle, for example, of 800 msec. In response to a control signal from the host computer 104, the switch control unit 130 of the reader/writer control unit 100 first turns ON the switch SW-A and turns OFF the other switches SW-B through SW-D, so that the transmission control unit 110 provides a transmission command to the reader/writer device R/W-A (200). Upon receipt of the transmission command, the reader/writer device R/W-A transmits an RF signal generated by modulating a carrier with an ID request command CMD during a short period of time, for example, of 10 msec, and then transmits a non-modulated carrier during a subsequent long period of time, for example, of 190 msec so as to supply electromagnetic energy to the possible RF ID tags.

In response to the RF signal carrying the ID request command received from the reader/writer device R/W-A 200, each of the RF ID tags TAG-A, TAG-C and TAG-D (500, 504 and 506) transmits back an RF response signal generated by modulating a carrier with each tag ID, in a time slot determined at random in accordance with a random number. The RF ID tag TAG-B does not receive the RF signal from the reader/writer device R/W-A.

After that, the switch control unit 130 of the reader/writer control unit 100 turns ON the switch SW-B and turns OFF the other switches SW-A, SW-C and SW-D, so that the transmission control unit 110 provides a transmission command to the reader/writer device R/W-B 202. Upon receipt of the transmission command, the reader/writer device R/W-B transmits an RF signal generated by modulating a carrier with an ID request command CMD during a short period of time, and then transmits a non-modulated carrier during a subsequent long period of time so as to supply electromagnetic energy to the possible RF ID tags.

In response to the RF signal carrying the ID request command received from the reader/writer device R/W-B (202), each of the RF ID tags TAG-B and TAG-C (502 and 504) transmits back an RF response signal generated by modulating a carrier with each tag ID, in a time slot determined at random in accordance with a random number. The RF ID tags TAG-A and TAG-D do not receive the RF signal from the reader/writer device R/W-B.

After that, the switch control unit 130 of the reader/writer control unit 100 turns ON the switch SW-C and turns OFF the other switches SW-A, SW-B and SW-D, so that the transmission control unit 110 provides a transmission command to the reader/writer device R/W-C (204). Upon receipt of the transmission command, the reader/writer device R/W-C transmits an RF signal generated by modulating a carrier with an ID request command CMD during a short period of time, and then transmits a non-modulated carrier during a subsequent long period of time so as to supply electromagnetic energy to the possible RF ID tags.

In response to the RF signal carrying the ID request command received from the reader/writer device R/W-C 204, each of the RF ID tags TAG-B through TAG-D (502-506) transmits back an RF response signal generated by modulating a carrier with each tag ID, in a time slot determined at random in accordance with a random number. The RF ID tag TAG-A does not receive the RF signal from the reader/writer device R/W-C.

After that, the switch control unit 130 of the reader/writer control unit 100 turns ON the switch SW-D and turns OFF the other switches SW-A through SW-C, so that the transmission control unit 110 provides a transmission command to the reader/writer device R/W-D (206). Upon receipt of the transmission command, the reader/writer device R/W-D transmits an RF signal generated by modulating a carrier with an ID request command CMD during a short period of time, and then transmits a non-modulated carrier during a subsequent long period of time so as to supply electromagnetic energy to the possible RF ID tags.

In response to the RF signal carrying the ID request command received from the reader/writer device R/W-D (206), each of the RF ID tags TAG-A and TAG-D (500 and 506) transmits back an RF response signal generated by modulating a carrier with each tag ID, in a time slot determined at random in accordance with a random number. The RF ID tags TAG-B and TAG-C do not receive the RF signal from the reader/writer device R/W-D.

In FIG. 12, subsequent to the ID request command transmitted by the reader/writer device R/W-A (200), the RF response signal from the RF ID tag TAG-A (500) is received only by the reader/writer device R/W-A (200), while the RF response signal from the RF ID tag TAG-C (504) is received by none of the reader/writer devices. Further, the RF response signal from the RF ID tag TAG-D (506) is received only by the reader/writer device R/W-D (206). The tag IDs carried by these RF response signals are decoded in the reader/writer devices R/W-A and R/W-D, so that the tag IDs are provided to the redundant ID filtering unit 120.

Subsequent to the ID request command transmitted by the reader/writer device R/W-B (202), the RF response signal from the RF ID tag TAG-B (502) is received only by the reader/writer device R/W-B (202), while the RF response signal of the RF ID tag TAG-C (504) is received only by the reader/writer device R/W-C (204). The tag IDs carried by these RF response signals are decoded in the reader/writer devices R/W-B and R/W-C, so that the tag IDs are provided to the redundant ID filtering unit 120.

Subsequent to the ID request command transmitted by the reader/writer device R/W-C (204), the RF response signal from the RF ID tag TAG-B (502) is received only by the reader/writer device R/W-B (202), while the RF response signal from the RF ID tag TAG-C (504) is received only by the reader/writer device R/W-B (202). Further, the RF response signal of the RF ID tag TAG-D (506) is received by none of the reader/writer devices. The tag IDs carried by these RF response signals are decoded in the reader/writer device R/W-B, so that the tag IDs are provided to the redundant ID filtering unit 120.

Subsequent to the ID request command transmitted by the reader/writer device R/W-D (206), the RF response signal of the RF ID tag TAG-A (500) is received only by the reader/writer device R/W-A (200), while the RF response signal from the RF ID tag TAG-D (506) is received only by the reader/writer device R/W-D (206). The tag IDs carried by these RF response signals are decoded in the reader/writer devices R/W-A and R/W-D, so that the tag IDs are provided to the redundant ID filtering unit 120.

The redundant ID filtering unit 120 accumulatively stores the received tag IDs into the memory 122, and then removes redundant or duplicated tag IDs with retaining one tag ID of each set of identical stored tag IDs. The distinct, filtered tag IDs are then provided to the host computer.

According to the embodiment of FIG. 10, read errors for RF ID tags due to the variations of the electromagnetic propagation environment can be reduced significantly.

Figure 13:
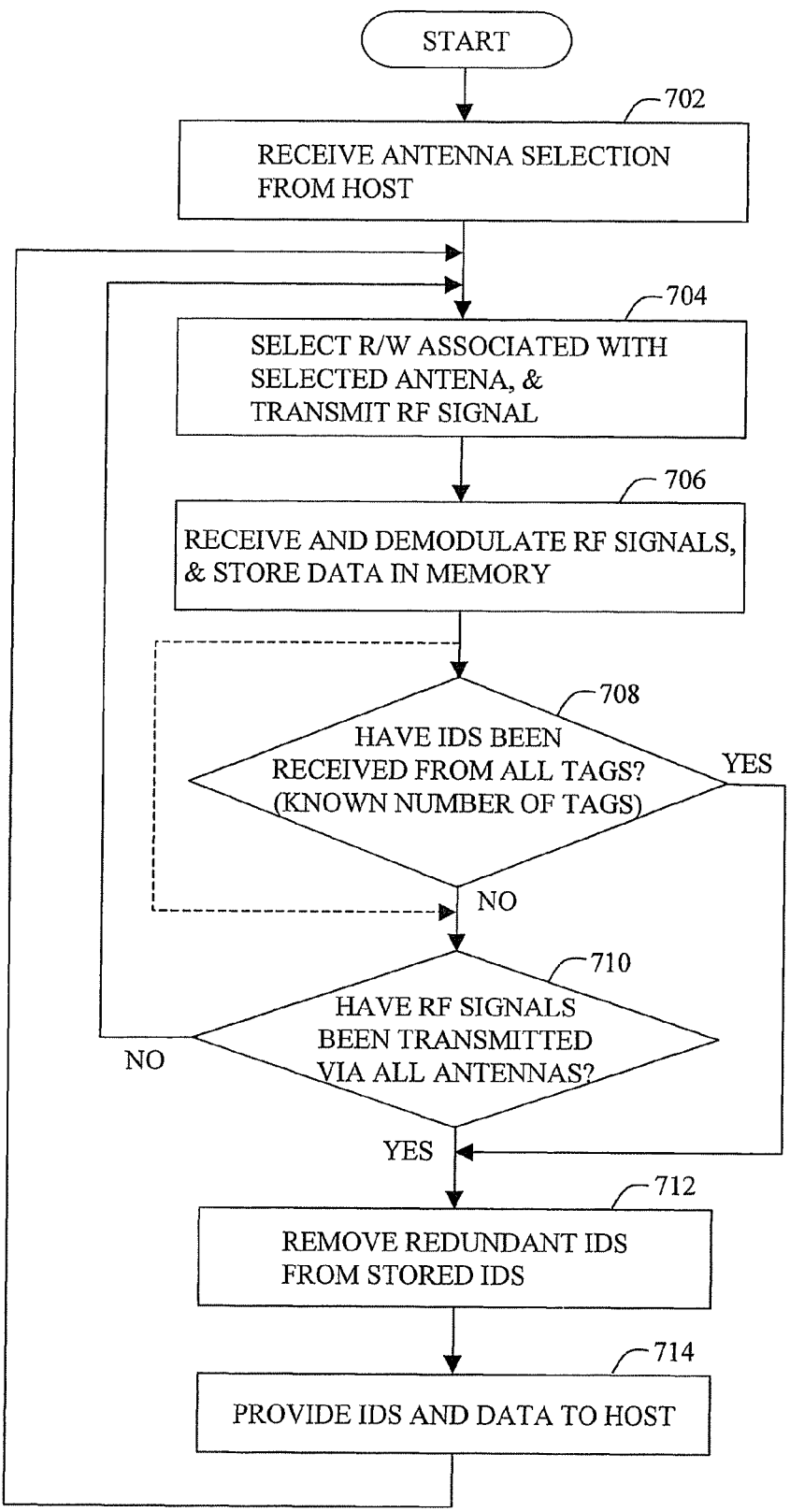
FIG. 13 is a flow chart for control of the reader/writer devices and the switches, performed by the reader/writer control unit of FIGS. 7, 9 and 11.

FIG. 13 is a flow chart for control of the reader/writer devices R/W-A through R/W-D 200-206 and the switches SW-A through SW-D, performed by the reader/writer control unit 100 of FIGS. 7, 9 and 11. This control may be executed by the processor 102 of the reader/writer control unit 100.

At Step 702, the switch control unit 130 receives, from the host computer 104, command data specifying the selection of one of the reader/writer devices (R/W-A through R/W-D) that corresponds to one of the antennas (ANT-A through ANT-D) to be used for the transmission of an ID request or send command. At Step 704, in response to the selection of the one reader/writer device, the switch control unit 130 turns ON the one of the switches SW-A through SW-D, so that the transmission control unit 110 provides a send command to the data encoding unit 230 of the selected one of the reader/writer devices R/W-A through R/W-D of FIG. 7, 9 or 11. The transmitter unit 236 of the selected one of the reader/writer devices R/W-A through R/W-D modulates a carrier with the encoded data provided by the data encoding unit 230, and transmits an RF command signal via the corresponding one of the antennas ANT-A through ANT-D.

At Step 706, ones of the receiver units 238 of the reader/writer devices R/W-A through R/W-D receive RF response signals via respective ones of the antennas ANT-A through ANT-D, and then demodulate the received signals. Then, the respective ones of decoding units 232 of the reader/writer devices R/W-A through R/W-D decode the demodulated baseband response signals to reproduce data such as the tag IDs, and then provide the reproduced data to the redundant ID filtering unit 120. The redundant ID filtering unit 120 accumulatively stores the tag IDs into the internal memory 122.

When the number of RF ID tags is unknown, after Step 706, the procedure goes to Step 710. When the number of RF ID tags is known, the redundant ID filtering unit 120 at Step 708 determines whether the IDs of all of the RF ID tags have been received. If it determined that the IDs of not all of the RF ID tags are yet received, the procedure goes to Step 710. If it is determined that the IDs of all of the RF ID tags have been received, the procedure goes to Step 712.

At Step 710, the transmission control unit 110 determines whether RF command signal have been transmitted via all of the predetermined antennas ANT-A and ANT-C or alternatively ANT-A through ANT-D, i.e., by all of the predetermined reader/writer devices R/W-A and R/W-C or alternatively R/W-A through R/W-D. If it determined that, via all of the predetermined antennas, the signals have been transmitted, then the procedure goes to Step 712. If it is determined that, via not all of the antennas, the signals have been transmitted, then the procedure returns to Step 704.

The redundant ID filtering unit 120 at Step 712 removes redundant or duplicated tag IDs among the tag IDs stored in the memory 122, and at Step 714 provides the redundancy removed tag IDs to the host computer 104. After that, the procedure returns to Step 702.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information stored in a plurality of contactless information storage devices, the information access system comprising:

a plurality of antennas arranged at respective different positions and used to communicate with the contactless information storage devices that pass through a given region substantially simultaneously;

a first plurality of reader devices coupled to the plurality of respective antennas and adapted to communicate with the contactless information storage devices; and a control unit to control the first plurality of reader devices and transmit, to another apparatus, data received from the first plurality of reader devices, wherein the control unit controls a second plurality of reader devices one by one cyclically and in a time division manner to transmit an RF identification request signal toward the given region via the corresponding antenna, and controls the first plurality of reader devices to receive RF response signals from the contactless information storage devices that are transmitted in response to the RF identification request signal, wherein the second plurality of reader devices is a subset of the first plurality of reader devices and fewer than the first plurality of reader devices, the first plurality of reader devices receive RF response signals replying to the RF identification request signal transmitted in one transmission cycle by each one reader device of the second plurality of reader devices, from the contactless information storage devices via the plurality of respective antennas, then reproduce identifications, and then provide the reproduced identifications to the control unit, and the control unit receives the reproduced identifications, then processes redundant identifications in the received identifications so as to produce distinct identifications with no redundancy, and then provides the distinct identifications with no redundancy to the other apparatus.

2. The information access system according to claim 1, wherein the control unit comprises an identification filtering unit to remove redundant identifications in the received identifications to produce distinct identifications with no redundancy.

3. An information access system for accessing information stored in contactless information storage devices, comprising:

a plurality of antennas arranged at respective different positions and used to communicate with the contactless information storage devices that pass through a given region substantially simultaneously;

a first plurality of reader devices coupled to the plurality of respective antennas and adapted to communicate with the contactless information storage devices; and a control unit to control the first plurality of reader devices and transmit, to another apparatus, data received from the first plurality of reader devices, wherein the control unit selects one reader device at a time from a second plurality of reader devices cyclically and in a time division manner, and controls the selected one reader device at the time to transmit an RF identification request signal toward the given region via the corresponding antenna, and controls the first plurality of reader devices to receive RF response signals from the contactless information storage devices that are transmitted in response to the RF identification request signal, wherein the second plurality of reader devices is a subset of the first plurality of reader devices and fewer than the first plurality of reader devices, the first plurality of reader devices receive RF response signals replying to the RF identification request signal transmitted in one transmission cycle by each one reader device of the second plurality of reader devices, from the contactless information storage devices via the plurality of respective antennas, then reproduce identifications, and then provide the reproduced identifications to the control unit, and the control unit receives the reproduced identifications, then processes redundant identifications in the received identifications so as to produce distinct identifications with no redundancy, and then provides the distinct identifications with no redundancy to the other apparatus.

4. The information access system according to claim 3, wherein each reader device of the first plurality of reader devices includes a receiver, the information access system includes a shared transmitter coupled between the control unit, and the shared transmitter is coupled to the second plurality of reader devices via respective switches.

5. In an information access system, a method for accessing information stored in contactless information storage devices, the information access system comprising:

a plurality of antennas arranged at respective different positions and used to communicate with the contactless information storage devices that pass through a given region substantially simultaneously, a first plurality of reader devices coupled to the plurality of respective antennas and adapted to communicate with the contactless information storage devices, and a control unit to control the first plurality of reader devices and transmit, to another apparatus, data received from the first plurality of reader devices, the method comprising:

controlling a second plurality of reader devices one by one cyclically and in a time division manner to transmit an RF identification request signal toward the given region via the corresponding antenna, wherein the second plurality of reader devices is a subset of the first plurality of reader devices and fewer than the first plurality of reader devices;

controlling the first plurality of reader devices to receive, via the plurality of corresponding antennas respectively, RF response signals from the contactless information storage devices that are transmitted in response to the RF identification request signal transmitted in one transmission cycle by each one reader device of the second plurality of reader devices, then reproduce identifications, and then provide the reproduced identifications to the control unit; and receiving the reproduced identifications, then processing redundant identifications in the received identifications so as to produce distinct identifications with no redundancy, and then providing the distinct identifications with no redundancy to the other apparatus.

6. In an information access system, a method for accessing information stored in contactless information storage devices, the information access system comprising:

a plurality of antennas arranged at respective different positions and used to communicate with the contactless information storage devices that pass through a given region substantially simultaneously;

a first plurality of reader devices coupled to the plurality of respective antennas and adapted to communicate with the contactless information storage devices; and a control unit to control the first plurality of reader devices and transmit, to another apparatus, data received from the first plurality of reader devices, the method comprising:

selecting one reader device at a time from a second plurality of reader devices cyclically and in a time division manner, and controlling the selected one reader device at the time to transmit an RF identification request signal toward the given region via the corresponding antenna, wherein the second plurality of reader devices is a subset of the first plurality of reader devices and fewer than the first plurality of reader devices, controlling the first plurality of reader devices to receive, via the plurality of corresponding antennas respectively, RF response signals from the contactless information storage devices that are transmitted in response to the RF identification request signal transmitted in one transmission cycle by each one reader device of the second plurality of reader devices, then reproduce identifications, and then provide the reproduced identifications to the control unit, and receiving the reproduced identifications, then processing redundant identifications in the received identifications so as to produce distinct identifications with no redundancy, and then providing the distinct identifications with no redundancy to the other apparatus.

* * * * *